W. E. RILEY.
RAKE ATTACHMENT.
APPLICATION FILED NOV. 11, 1908.
922,515.
Patented May 25, 1909.
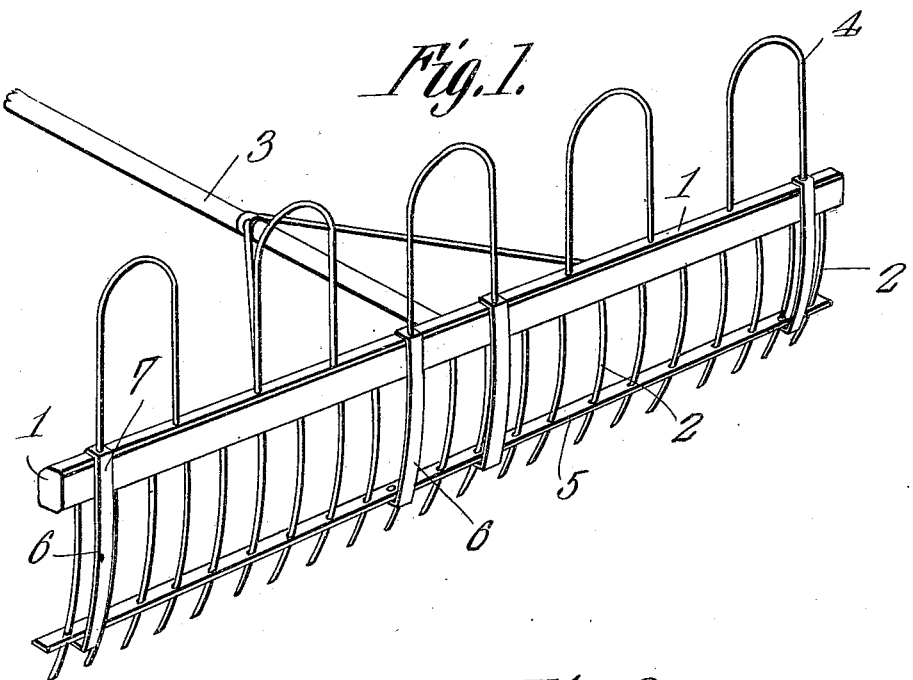
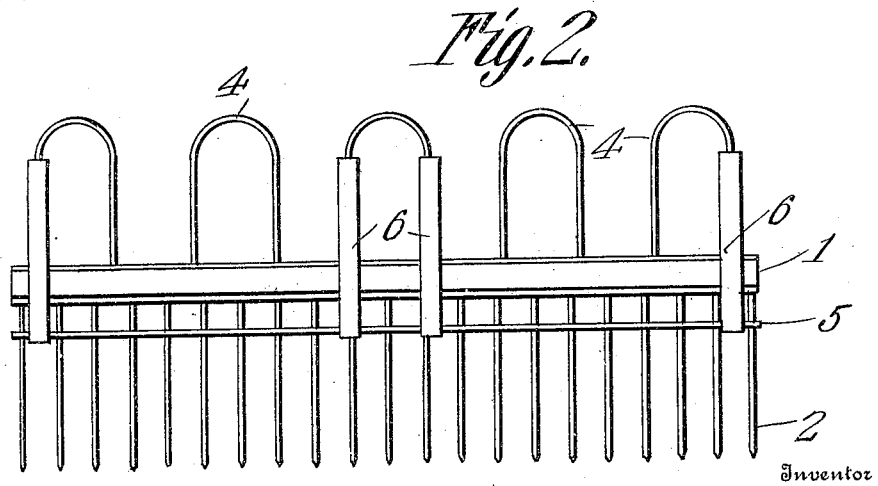

UNITED STATES PATENT OFFICE.

WILLIAM E. RILEY, OF SARATOGA SPRINGS, NEW YORK.

RAKE ATTACHMENT.

No. 922,515.            Specification of Letters Patent.            Patented May 25, 1909.

Application filed November 11, 1908. Serial No. 462,168.

*To all whom it may concern:*

Be it known that I, WILLIAM E. RILEY, a subject of the King of England, residing at Saratoga Springs, in the county of Saratoga and State of New York, have invented a new and useful Rake Attachment, of which the following is a specification.

This invention relates to hand rakes and more particularly to the kind used for removing leaves and the like from lawns.

One object of the present invention is to provide a head carrying curved teeth which will have little tendency to uproot the grass during the operation of raking.

Another object is to provide a cleaning bar which will operate to remove all matter collected on the teeth whenever the rake is raised from the ground.

A further object is to equip the head with a means for preventing the raked leaves from passing thereover during the raking operation.

With these and other objects in view as will more fully hereinafter appear, the present invention consists in certain novel details of construction and arrangement of parts hereinafter fully described, illustrated in the accompanying drawings, and more particularly pointed out in the appended claims, it being understood that various changes in the form, proportion, size and minor details of the device may be made without departing from the spirit or sacrificing any of the advantages of the invention.

In the accompanying drawings forming part of this specification:—Figure 1 is a perspective of a rake fitted with the attachment, and showing the position of the cleaner at the beginning of the raking operation when the teeth are upon the ground. Fig. 2 is a front elevation showing the cleaner suspended.

Similar numerals of reference are employed to designate corresponding parts throughout.

In carrying out the invention, I arrange on the upper side of the head 1 a series of equally spaced U shaped guards which add to the height of the rake, thereby making it possible to draw a larger volume of leaves and facilitate the work.

The rake teeth 2, which are curved toward the handle 3, are disposed in the usual manner on the lower side of the head, their curved shape bringing the pointed ends substantially parallel to the ground when the handle is elevated, thereby making it less difficult for the operator to draw the rake and also lessening the danger of the teeth uprooting the grass. The teeth are provided with a cleaning bar adapted to move vertically, and connection between the cleaning bar, and guards is established by means of links.

Each of the guards 4 is formed of a single piece of wire or other suitable material, bent substantially U shaped, and the terminals of which enter openings formed in the upper side of the head 1.

The number of guards employed will vary according to the length of head, and the spaces between the guards will be approximately the same as the space between the arms of one guard.

The cleaning bar 5 formed of a single piece of sheet metal or other suitable material is rectangular in cross section, and approximately the same in length as the head 1. The bar is provided with a series of equally spaced elongated openings of greater diameter than the diameter of the teeth. The space between the centers of any two of these openings will be the same as that between the centers of any two teeth so that the bar may be placed to slide over the teeth, as shown in Figs. 1 and 2.

Connections between the cleaning bar 5 and guards 4 is established by means of links 6. Each of these members is formed of a single piece of sheet metal or other suitable material, slightly curved to conform to the shape of the teeth, and adjacent either end is bent at substantially right angles so as to form arms 7. The lower of these arms is secured to the lower face of the cleaning bar, while the upper is provided with an opening through which enters one arm of the guards 4.

In the form illustrated in Figs. 1 and 2, four supporting links are shown applied to either end and the intermediate portions of the cleaning bar, and are disposed over the front faces of the latter and the head 1. Thus it will be seen that when the parts are in position, as shown by Fig. 1, the cleaning bar will be supported slightly above the terminals of the teeth and as the operation of raking continues and the leaves become wedged between the teeth or impaled thereon, the cleaning bar will be gradually raised to the position shown by Fig. 2. By now lifting the rake from the ground the weight of the bar and links will be sufficient to make the same descend and thereby clean the teeth.

Having thus described the invention what is claimed is:—

1. The combination of a hand rake provided with a guard on the upper side of the rake head, a cleaning bar slidingly mounted on the rake teeth, and a sliding connection between said guard and cleaning bar.

2. The combination of a hand rake provided with a guard on the upper side of the rake head, a cleaning bar having perforations whereby it is mounted to slide vertically on the rake teeth, and a link having one end secured to said cleaner bar and its opposite end slidingly fitted to said guard.

3. The combination of a hand rake provided with substantially U shaped guards on the upper side of the rake head, a cleaning bar mounted to slide vertically on the rake teeth, and links having their lower ends connected to said cleaning bar and their upper ends slidingly fitted to the U shaped guards.

4. The combination of a hand rake provided with spaced vertical guards on the upper side of the rake head, a cleaning bar mounted to slide vertically on the rake teeth, and links having their lower ends rigidly secured to said cleaning bar and their upper ends slidingly fitted to said vertical guards.

In testimony that I claim the foregoing as my own, I have hereto affixed my signature in the presence of two witnesses.

WILLIAM E. RILEY.

Witnesses:
HORACE N. HAAS,
LEWIS H. OSTRANDER.